(12) United States Patent
Ikeda et al.

(10) Patent No.: US 7,807,088 B2
(45) Date of Patent: Oct. 5, 2010

(54) POLYVINYLIDENE FLUORIDE RESIN POWDER FOR MELT MOLDING AND PROCESS FOR PRODUCING MOLDING FROM THE RESIN POWDER

(75) Inventors: Tsukasa Ikeda, Fukushima (JP); Yasuhiro Suzuki, Fukushima (JP); Kenichi Iwabuchi, Fukushima (JP); Takumi Katsurao, Tokyo (JP)

(73) Assignee: Kureha Corporation, Tokyo (JP)

( * ) Notice: Subject to any disclaimer, the term of this patent is extended or adjusted under 35 U.S.C. 154(b) by 420 days.

(21) Appl. No.: 11/665,639

(22) PCT Filed: Oct. 13, 2005

(86) PCT No.: PCT/JP2005/019244

§ 371 (c)(1), (2), (4) Date: Apr. 18, 2007

(87) PCT Pub. No.: WO2006/043609

PCT Pub. Date: Apr. 27, 2006

(65) Prior Publication Data

US 2007/0290407 A1    Dec. 20, 2007

(30) Foreign Application Priority Data

Oct. 20, 2004  (JP) ............................. 2004-305747

(51) Int. Cl.
*B29C 45/48* (2006.01)
*B29C 45/73* (2006.01)
*B29C 45/74* (2006.01)

(52) U.S. Cl. ..................... 264/328.16; 264/328.17; 428/402

(58) Field of Classification Search ........................ None
See application file for complete search history.

(56) References Cited

U.S. PATENT DOCUMENTS

| 5,145,921 A | 9/1992 | Lasson |
| 6,846,436 B1 | 1/2005 | Kitamura et al. |

FOREIGN PATENT DOCUMENTS

| EP | 0526216 A2 | 7/1992 |
| EP | 0 893 457 A1 | 7/1998 |
| EP | 1227109 A2 | 1/2002 |
| EP | 1452550 A1 | 11/2002 |
| EP | 1380605 A1 | 7/2003 |
| EP | 1621573 A1 | 4/2004 |
| GB | 1 509 404 | 7/1975 |
| JP | 51-5386 | 7/1974 |
| JP | 61-185428 | 2/1985 |
| JP | 02-029402 | 7/1988 |
| JP | 03-185007 | 10/1990 |
| JP | 11-080216 | 7/1998 |

OTHER PUBLICATIONS

Extended European Search Report dated May 4, 2009.
Zhou, Y.C. et al., "An Experimental and numerical study of the angle of repose of coarse spheres," Powder Technology, 125 (2002) 45-54.
Burkalow, "Angle of Repose and Angle of Sliding Friction: An Experimental Study," Bulletin of the Geological Society of America, vol. 56, pp. 669-707, Jun. 1945.

*Primary Examiner*—Monica A Huson
(74) *Attorney, Agent, or Firm*—Reed Smith LLP

(57) ABSTRACT

Polyvinylidene fluoride resin powder for melt molding, which exhibits such particle size distribution characteristics that the average particle diameter ($D_{50}$) is 80 to 250 μm, the proportion of resin powder having a particle diameter of at most 45 μm is at most 15.0% by weight, and the proportion of resin powder having a particle diameter of at least 355 μm is at most 10.0% by weight, and has a bulk density of 0.30 to 0.80 g/cm$^3$ and an angle of repose of at most 40°, and a process for producing a molding, which comprises feeding the resin powder to an injection molding machine or extrusion molding machine, melting the resin powder, and injecting the resin melt into a mold.

12 Claims, No Drawings ably decomposition
POLYVINYLIDENE FLUORIDE RESIN POWDER FOR MELT MOLDING AND PROCESS FOR PRODUCING MOLDING FROM THE RESIN POWDER

TECHNICAL FIELD

The present invention relates to polyvinylidene fluoride resin powder for melt molding, and more particularly to polyvinylidene fluoride resin powder capable of being molded by press-fit technique such as injection molding or extrusion molding while retaining the form of the powdery resin as it is without pelletizing the powder.

The present invention also relates to a process for producing a molding by feeding the polyvinylidene fluoride resin powder for melt molding to an injection molding machine or extrusion molding machine (extruder) while retaining the form thereof, melting the resin powder and then injecting the resin melt into a mold.

BACKGROUND ART

A polyvinylidene fluoride resin (hereinafter abbreviated as "PVDF resin") is a crystalline resin having a low glass transition temperature and is excellent in heat resistance, chemical resistance, mechanical properties (for example, tensile strength, flexural modulus, flexural strength, compressive strength and impact resistance), abrasion resistance, flame retardancy and weatherability. The PVDF resin also develops extremely specific electrical properties in cooperation with a feature that a dipole moment of a C—F bond in its molecular structure is high.

Other basic properties of the PVDF resin include good melt processability. In other words, the PVDF resin has a wide processable temperature range from its melting point to its decomposition point and exhibits good melt-flow characteristics.

As described above, the PVDF resin has well balanced physical properties and good processability in combination, and application fields thereof extend to a wide variety of fields of abrasion-resistant materials, weatherable materials, electric and electronic materials, leisure materials, and the like.

The PVDF resin is excellent in the suitability for secondary processing such as machining, bending or welding after primary processing. For example, a machining stock such as a thick-wall round bar or plate is produced by extrusion molding making use of the PVDF resin. The machining stock is machined into a desired shape by milling, perforating, cutting, combinations thereof, or the like.

However, the PVDF resin has a drawback that a molten resin is colored when a molding temperature becomes high in melt molding such as injection molding or extrusion molding. In order to avoid the coloring of the molten resin, the molding temperature in the injection molding or extrusion molding is generally controlled in such a manner that the temperature of the molten resin is 280° C. or lower.

In the injection molding or extrusion molding, pellets of the PVDF resin are generally used. For example, when a molding such as a wafer carrier, joint or valve is molded by injection molding, a screw injection molding machine is ordinarily used. The pellets are fed into a heated cylinder of the injection molding machine by rotation of a screw. The pellets are fed by the screw and at the same time, evenly melted. The molten resin is injected into a mold from the injection molding machine.

In the extrusion molding, the pellets are fed into a heated cylinder of an extrusion molding machine by rotation of a screw, and the molten resin is extruded into a shape of, for example, a rod, plate or pipe from a forming die installed in the tip of an extruder.

In such a conventional melt molding process, the PVDF resin is subjected to thermal history upon the formation of pellets and further subjected to thermal history even upon the melt molding, so that it is difficult to prevent the coloring of the resulting molding by only controlling the molding temperature upon the melt molding low. An extrusion-molded product used as a machining stock, to say nothing of an injection-molded product, is required to have a beautiful color tone and be little colored. In recent years, there has been a strong demand for provision of a PVDF resin molding having high performance and high quality, and so it is required to develop a new technique for inhibiting coloring upon melt molding.

More specifically, PVDF resins can be synthesized by various polymerization processes. In industrial production, however, the resins are synthesized by an emulsion polymerization process and a suspension polymerization process. A PVDF resin synthesized is collected in the form of resin powder. Powder characteristics of the resin powder such as average particle diameter, particle size distribution and evenness of particle shape vary according to the kind and amount of a polymerization initiator, the kind and amount of a suspending agent or emulsifier, the kind of a reaction medium, a polymerization temperature and a manner of combining them. In the emulsion polymerization process, a latex having a small particle diameter of about 0.2 to 0.5 µm is formed and is subjected to a granulation treatment using a flocculant after the polymerization.

When it has been intended to produce moldings with PVDF resin powder by melt molding such as injection molding or extrusion molding, it has been impossible or extremely difficult to obtain moldings having a fixed shape and quality because the powder has been unable to be stably fed into a cylinder of a molding machine, or an extrusion rate has become unstable.

Therefore, the PVDF resin powder has heretofore been not fed to injection molding or extrusion molding as it is in a state of resin powder, but fed after melt processing into pellets (for example, U.S. Pat. No. 6,846,436 B1). A pelletizing step has been considered to be necessary even for evenly kneading the PVDF resin powder with various kinds of additives.

When the PVDF resin powder is pelletized, the PVDF resin is subjected to thermal history in addition to the fact that it takes time, and the cost becomes high. Therefore, when the resultant pellets are used to conduct melt molding, the pellets are subjected again to thermal history at a high temperature, so that such pellets have involved a problem that the resultant molding is colored even when the molding temperature is controlled low.

However, no PVDF resin powder capable of being stably melt-molded has heretofore been proposed. A PVDF resin for melt molding is marketed in the form of pellets. Some PVDF resins are marketed in the form of resin powder. It has however been general that when injection molding or extrusion molding is conducted, the resin powder is pelletized and then fed into a molding machine.

Since the pellets are not a final molding, there is no need to strictly control a scatter of shape. Accordingly, a single-screw or twin-screw extruder is ordinarily used in pelletizing of the PVDF resin. However, the processing conditions may not be strictly controlled because the resin is melt-extruded into a fine strand from a die nozzle and cut into a proper size, or a resin ejected is only cut on the tip of an extruder unlike general melt molding into a molding.

On the other hand, in injection molding or extrusion molding of the PVDF resin, it is necessary to use a molding machine suitable for it, stably feed a resin material to the molding machine and strictly control an extrusion rate and molding conditions so as to mold a molding having a fixed quality.

DISCLOSURE OF THE INVENTION

It is an object of the present invention to provide polyvinylidene fluoride resin powder capable of stably fed to an injection molding machine or extrusion molding machine in the form of the resin powder and providing moldings, which are excellent in various properties like a case where pellets are used, and inhibited from coloring compared with the case where pellets are used.

Another object of the present invention is to provide a process for producing a molding, by which a molding, which is excellent in various properties and inhibited from coloring, can be stably and cheaply produced by injection-molding or extrusion-molding polyvinylidene fluoride resin powder obtained by polymerization and having specific powder characteristics in a state of the resin powder without pelletizing the powder.

The present inventors have carried out an extensive investigation with a view toward achieving the above objects. As a result, it has been found that polyvinylidene fluoride resin powder, which has specific particle size distribution characteristics, is high in bulk density (bulk specific gravity) and low in angle of repose, is excellent in flowability and good in intermesh with a screw installed in a cylinder of an injection molding machine or extrusion molding machine.

Many of powdery PVDF resins currently marketed are low in bulk density and high in angle of repose, or small in average particle diameter, or broad in particle size distribution, or small in average particle diameter, low in bulk density and high in angle of repose. When such conventional PVDF resin powder is fed to an injection molding machine or extrusion molding machine, the intermesh of the resin powder with a screw in a cylinder is poor, so that the stable feed is difficult in itself, and moreover it is impossible to injection-mold it in a fixed amount or continuously extrude it.

On the other hand, since the PVDF resin powder according to the present invention has specific powder characteristics, it is excellent in flowability, can be stably fed to a molding machine and can be precisely and stably weighed and molded like pellets thereof. A molding obtained by melting the PVDF resin powder according to the present invention and conducting transfer molding into a mold is inhibited from coloring by heating compared with a molding obtained by melt molding after pelletizing and is comparable even from the viewpoint of mechanical properties.

According to the production process of the present invention, a pelletizing step can be omitted because the PVDF resin powder having the specific powder characteristics is used, so that production cost can be reduced.

The present invention has been led to completion on the basis of these findings.

According to the present invention, there is provided polyvinylidene fluoride resin powder for melt molding, which has such powder characteristics (a) to (c) that
(a) the resin powder exhibits, as determined by a dry sieving method in accordance with JIS K 0069, such particle size distribution characteristics that
  i) the average particle diameter indicated by a 50% cumulative value ($D_{50}$) in a particle size cumulative distribution is 80 to 250 µm,
  ii) the proportion of resin powder having a particle diameter of at most 45 µm is at most 15.0% by weight, and
  iii) the proportion of resin powder having a particle diameter of at least 355 µm is at most 10.0% by weight,
(b) the bulk density is 0.30 to 0.80 g/cm$^3$, and
(c) the angle of repose is at most 40°.

According to the present invention, there is also provided a process for producing a polyvinylidene fluoride resin molding, which comprises the following Steps 1 to 3:
1) Step 1 of feeding, to a melt molding machine, polyvinylidene fluoride resin powder for melt molding, which has such powder characteristics (a) to (c) that
  (a) the resin powder exhibits, as determined by a dry sieving method in accordance with JIS K 0069, such particle size distribution characteristics that
    i) the average particle diameter indicated by a 50% cumulative value ($D_{50}$) in a particle size cumulative distribution is 80 to 250 µm,
    ii) the proportion of resin powder having a particle diameter of at most 45 µm is at most 15.0% by weight, and
    iii) the proportion of resin powder having a particle diameter of at least 355 µm is at most 10.0% by weight,
  (b) the bulk density is 0.30 to 0.80 g/cm$^3$, and
  (c) the angle of repose is at most 40°,
  in a state of the resin powder;
2) Step 2 of heating and melting the resin powder in the melt molding machine into a resin melt; and
3) Step 3 of injecting the resin melt into a mold to mold the resin melt.

BEST MODE FOR CARRYING OUT THE INVENTION

A polyvinylidene fluoride resin (PVDF resin) is a homopolymer of vinylidene fluoride or copolymers of vinylidene fluoride and monomer(s) copolymerizable therewith, comprising vinylidene fluoride as a principal structural unit.

Examples of the vinylidene fluoride copolymer include vinylidene fluoride-hexafluoropropylene copolymers, vinylidene fluoride-tetrafluoroethylene copolymers, vinylidene fluoride-chlorotrifluoroethylene copolymers, vinylidene fluoride-trifluoroethylene copolymers, vinylidene fluoride-tetrafluoroethylene-hexafluoropropylene terpolymers and vinylidene fluoride-chlorotrifluoroethylene-hexafluoropropylene terpolymers.

These vinylidene fluoride copolymers are crystalline thermoplastic resins, in which the copolymerization ratio of comonomers such as hexafluoropropylene is 15 mol % or lower, preferably 10 mol % or lower, more preferably 5 mol % or lower. The lower limit of the proportion of the comonomer is preferably 1 mol %.

The homopolymer (PVDF) of vinylidene fluoride is a crystalline resin. When the crystallinity thereof is broken by copolymerization to form an elastomer, it is necessary to increase the copolymerization ratio of the comonomer such as hexafluoropropylene. In a commercially available elastomer, the copolymerization ratio of the comonomer is actually 20 mol % or higher. The PVDF resin used in the present invention is a polymer having a specific crystal structure of α type, β type, γ type, αp type or the like.

Among the PVDF resins, a polyvinylidene fluoride homopolymer (PVDF) and vinylidene fluoride-hexafluoropropylene copolymers containing hexafluoropropylene in a proportion of 15 mol % or lower are preferred from the viewpoints of melt moldability, mechanical properties, stain resistance, solvent resistance and secondary processability.

The PVDF resin powder according to the present invention can be prepared by a suspension polymerization process or emulsion polymerization process. In the emulsion polymerization, a chemically stable fluorinated emulsifier is used to conduct polymerization using, as a polymerization initiator, an inorganic peroxide, organic peroxide or organic percarbonate compound. After the emulsion polymerization, a latex having a fine particle diameter of sub-micron unit is precipitated and aggregated with a flocculant, thereby collecting the powder as resin particles having a proper size.

The PVDF resin powder is preferably prepared by the suspension polymerization process from the viewpoint of powder characteristics such as bulk density and angle of repose. In the suspension polymerization for the PVDF resin, polymerization is conducted by using a suspending agent such as methyl cellulose and dispersing a vinylidene fluoride monomer and comonomers such as hexafluoropropylene in an aqueous medium.

A process, in which an organic percarbonate (for example, di-n-propyl peroxydicarbonate) having activity at a low temperature is used as a polymerization initiator in the suspension polymerization to initiate a polymerization reaction at a temperature not higher than a critical temperature of 30.1° C., preferably 10 to 30° C., more preferably 20 to 28° C., thereby forming polymer particles (primary particles), and the temperature is raised to 30 to 90° C., preferably 40 to 80° C. to continue the polymerization reaction, is preferred from the viewpoint of obtaining polymer particles high in bulk density and low in angle of repose. A chain transfer agent may be used to control the molecular weight of the resulting PVDF resin.

Polymerization conditions such as the proportion of the suspending agent used to the monomers, the amount of the monomers charged into the aqueous medium, the droplet diameter of monomer droplets in the aqueous medium, the polymerization temperature and the polymerization time are controlled, whereby the powder characteristics of the polymer to be formed, such as the particle size distribution including the average particle diameter, the bulk density and the angle of repose can be adjusted. The particle size distribution characteristics can also be adjusted by classifying the resin powder obtained by the polymerization so as to fall within a desired range.

The inherent viscosity of the PVDF resin is preferably 0.70 to 1.50 dl/g, more preferably 0.80 to 1.30 dl/g. The inherent viscosity of the PVDF resin is a logarithmic viscosity at 30° C. of a solution with 4 g of the resin dissolved in 1 liter of N,N-dimethylformamide and measured by means of an Ubbelohde viscometer. The melting point of the PVDF resin is preferably 130 to 177° C. The melting point of the PVDF resin is a value measured by means of a differential scanning calorimeter (DSC).

The PVDF resin powder for melt molding according to the present invention has the following powder characteristics (a) to (c):
(a) the resin powder exhibits, as determined by a dry sieving method in accordance with JIS K 0069, such particle size distribution characteristics that
   i) the average particle diameter indicated by a 50% cumulative value ($D_{50}$) in a particle size cumulative distribution is 80 to 250 μm,
   ii) the proportion of resin powder having a particle diameter of at most 45 μm is at most 15.0% by weight, and
   iii) the proportion of resin powder having a particle diameter of at least 355 μm is at most 10.0% by weight,
(b) the bulk density is 0.30 to 0.80 g/cm$^3$, and
(c) the angle of repose is at most 40°.

The particle size distribution characteristics of the PVDF resin according to the present invention are derived on the basis of the particle size distribution measured by the dry sieving method in accordance with JIS K 0069-3.1. More specifically, they are particle size distribution characteristics measured by a measuring method described in EXAMPLES, which will be described subsequently.

The average particle diameter ($D_{50}$) of the PVDF resin powder for melt molding according to the present invention is 80 to 250 μm, preferably 100 to 230 μm, more preferably 130 to 210 μm. If the average particle diameter of the PVDF resin powder is too small, such powder tends to deteriorate the flowability or lower the stability of feeding to a molding machine. If the average particle diameter of the PVDF resin powder is too small or too great, the amount of finely divided particles or coarse particles formed increases, so that the particle size distribution becomes broad. When the particle size distribution of the PVDF resin particles becomes broad, a difference occurs in a molten state between resin particles in a cylinder of a molding machine, so that the molten state is liable to be varied. As a result, an extrusion rate varies to encounter difficulty upon provision of a molding having a fixed shape and quality.

The PVDF resin powder for melt molding according to the present invention desirably exhibits such a sharp particle size distribution that a value $[(D_{80}-D_{20})/D_{50}]$ (hereinafter referred to as "normalized value of particle size distribution") obtained by dividing a particle diameter breadth ($D_{80}-D_{20}$) represented by a difference between a 80% cumulative value ($D_{80}$) and a 20% cumulative value ($D_{20}$) in the particle size cumulative distribution by the 50% cumulative value ($D_{50}$; average particle diameter) is preferably at most 0.8, more preferably at most 0.6. The PVDF resin powder is small in the normalized value of the particle size distribution and sharp in the particle size distribution, whereby such powder can be evenly melted upon melt molding to provide a high-quality molding having a fixed shape.

The proportion of PVDF resin powder having a particle diameter of at most 45 μm is at most 15.0% by weight, preferably at most 10.0% by weight, more preferably at most 3.0% by weight. The proportion of the PVDF resin powder having a particle diameter of at most 45 μm can be reduced to often 2.0% by weight or lower, further 1.0% by weight or lower. The lower limit of the proportion of the PVDF resin powder having a particle diameter of at most 45 μm is of the order of generally 0.01% by weight, often 0.1% by weight.

If the proportion of the PVDF resin powder having a particle diameter of at most 45 μm is too high, electrostatic cling is easy to occur in a feeder or loading port (hopper or the like), which forms the main cause of unstable feeding. If the proportion of the PVDF resin powder having a particle diameter of at most 45 μm is high, finely divided powder tends to be melted in the vicinity of a feed opening of a cylinder, so that an extrusion rate becomes unstable, which form the main cause of a surging phenomenon.

The proportion of PVDF resin powder having a particle diameter of at least 355 μm is at most 10.0% by weight, preferably at most 7.0% by weight, more preferably at most 5.0% by weight. The proportion of the PVDF resin powder having a particle diameter of at least 355 μm can be reduced to often 4.0% by weight or lower, further 3.0% by weight or lower. The lower limit of the proportion of the PVDF resin powder having a particle diameter of at least 355 μm is of the order of generally 0.05% by weight, often 0.1% by weight.

The resin powder having a particle diameter of at least 355 μm is slow in the heat transfer rate up to the central portion thereof, so that such resin powder may possibly become unmelted in the molten resin within a cylinder of a molding machine in the process of the present invention in which the PVDF resin powder is fed to the molding machine. When a molten resin containing unmelted matter is subjected to injection molding or extrusion molding, such unmelted matter forms the main cause of appearance defect and deterioration of physical properties in the resulting molding.

The bulk density (bulk specific gravity) of the PVDF resin powder for melt molding according to the present invention is 0.30 to 0.80 g/cm$^3$, preferably 0.35 to 0.75 g/cm$^3$, more preferably 0.40 to 0.70 g/cm$^3$. If the bulk density of the PVDF resin powder is too low, the amount of air entrained in a molding machine is increased. As a result, deaeration becomes insufficient, so that voids are generated in the resulting molding, or bubbling is caused during molding. The bulk density is a value measured by a method described in EXAMPLES, which will be described subsequently.

The angle of repose of the PVDF resin powder for melt molding according to the present invention is at most 40°, preferably at most 38°, more preferably at most 35°. If the angle of repose of the PVDF resin powder is too high, the flowability of such resin powder is poor, and it is difficult to feed a fixed amount of the resin powder from a feeder. If the angle of repose of the PVDF resin powder is too high also, bridging is easy to occur in a loading port of the raw material. The lower limit of the angle of repose of the PVDF resin powder is generally 20°, often 23°. The angle of repose is a value measured by a method described in EXAMPLES, which will be described subsequently.

The PVDF resin powder for melt molding according to the present invention has powder characteristics such as particle size distribution, bulk density and angle of repose, which permit stable feeding to an injection molding machine or extrusion molding machine, and can be fed to the molding machine while retaining the form of the powdery resin as it is without pelletizing the powder to subject it to melt molding such as injection molding or extrusion molding.

The process according to the present invention for producing a molding is a process for producing a molding, which comprises feeding the PVDF resin powder having the specific powder characteristics to a melt molding machine in the form of the resin powder, melting the resin powder and injecting the resultant resin melt into a mold to mold it.

More specifically, the process according to the present invention for producing a molding comprises the following Steps 1 to 3:
1) Step 1 of feeding, to a melt molding machine, polyvinylidene fluoride resin powder for melt molding, which has such powder characteristics (a) to (c) that
    (a) the resin powder exhibits, as determined by a dry sieving method in accordance with JIS K 0069, such particle size distribution characteristics that
        i) the average particle diameter indicated by a 50% cumulative value ($D_{50}$) in a particle size cumulative distribution is 80 to 250 μm,
        ii) the proportion of resin powder having a particle diameter of at most 45 μm is at most 15.0% by weight, and
        iii) the proportion of resin powder having a particle diameter of at least 355 μm is at most 10.0% by weight,
    (b) the bulk density is 0.30 to 0.80 g/cm$^3$, and
    (c) the angle of repose is at most 40°,
    in a state of the resin powder;
2) Step 2 of heating and melting the resin powder in the melt molding machine into a resin melt; and
3) Step 3 of injecting the resin melt into a mold to mold the resin melt.

The resin melt obtained by melting in the melt molding machine is preferably injected into the mold under a pressure of 50 to 500 MPa.

The melt molding machine includes an injection molding machine. In this case, an injection mold is used as the mold. The melt molding machine also includes an extrusion molding machine. In this case, the mold is a forming die into which the resin melt ejected from a nozzle on the tip of the extrusion molding machine is filled.

In order to conduct injection molding using the PVDF resin powder according to the present invention, the PVDF resin powder is fed to an inlet of a heated cylinder of a screw type injection molding machine. The PVDF resin powder fed into a hopper by a loader is fed to the inlet of the cylinder directly from the hopper or through a feeder. In order to stabilize an extrusion rate and provide a molding having a fixed shape and quality, it is particularly desirable to feed the resin powder at such a feed rate that a screw can be seen at the inlet of the cylinder through the feeder, i.e., by starved feeding.

The highest temperature within the cylinder is controlled to generally 190 to 280° C., preferably 200 to 250° C. The PVDF resin powder melted by being subjected to heating and shearing force within the cylinder is extruded as a resin melt from the cylinder and injected into a mold under an injection pressure within the cylinder of preferably 50 to 500 MPa, more preferably 150 to 300 MPa. The temperature of the nozzle on the tip of the cylinder, from which the resin melt is injected, is controlled to preferably 200 to 250° C. The mold temperature is controlled to generally 80 to 150° C., preferably 90 to 130° C.

Accordingly, when a molding is produced with the PVDF resin powder according to the present invention by the injection molding, it is preferable to adopt a process comprising:
in Step 1, feeding the polyvinylidene fluoride resin powder for melt molding in a state of the resin powder to the inlet of the cylinder equipped with a screw in the injection molding machine,
in Step 2, heating and melting the resin powder in the cylinder controlled to a temperature of 190 to 280° C. into a resin melt, and
in Step 3, injecting the resin melt into the mold controlled to a temperature of 80 to 150° C. from the nozzle on the tip of the cylinder under an injection pressure within the cylinder of 50 to 500 MPa to mold the resin melt.

It is also preferable to adopt a process comprising, in Step 1, feeding the PVDF resin powder for melt molding in the state of the resin powder to the inlet of the cylinder from a feeder by starved feeding at such a feed rate that the cylinder can be seen at the inlet of the cylinder.

In order to conduct solidification extrusion molding with the PVDF resin powder according to the present invention by means of a forming die, the PVDF resin powder is fed into a heated cylinder of an extruder. The PVDF resin powder fed into a hopper by a loader is fed to the inlet of the cylinder directly from the hopper or through a feeder. In order to stabilize an extrusion rate and provide a molding having a fixed shape and quality, it is particularly desirable to feed the resin powder at such a feed rate that a screw can be seen at the inlet of the cylinder through the feeder, i.e., by starved feeding.

The temperature within the cylinder is controlled to generally 50 to 280° C., preferably 50 to 250° C., more preferably 50 to 220° C. The PVDF resin powder melted by being subjected to heating and shearing force within the cylinder is extruded from a die nozzle on the tip of the extruder. The temperature of the die nozzle is controlled to generally 190 to 280° C., preferably 200 to 250° C.

In the solidification extrusion molding process, an extrusion molding machine with the die nozzle on the tip of the extruder linked to the forming die is used. The forming die is a die having a structure that is equipped with a cooling device on an external portion thereof and with a passage linked to a passage of the die nozzle in an internal portion thereof. An extrudate in a molten state, which has been extruded from the die nozzle, is guided to the forming die and cooled and solidified in the interior thereof. Accordingly, the extrudate extruded from the forming die arranged on the tip of the extrusion molding machine is extruded in a solidified state to the outside.

When the resin melt is injected into the forming die from the die nozzle, the pressure (measured as an external pressure of die) of the forming die is controlled so as to amount to preferably 50 to 500 MPa, more preferably 150 to 400 MPa. A specific example of an extrusion molding machine suitable for use in such solidification extrusion molding includes that disclosed in, for example, Japanese Patent Application Laid-Open No. 61-185428.

According to the result of the investigation by the present inventors, it has been found that the PVDF resin powder having the specific powder characteristics is subjected to the solidification extrusion molding, whereby an extruded product suitable for use in machining such as milling, perforating or cutting, thick in wall, free of voids and excellent in the color tone of the surface and sectional surface thereof can be obtained.

More specifically, the production process according to the present invention includes a process for producing a molding, which comprises using the PVDF resin powder having the specific powder characteristics as a raw material and subjecting the resin powder to solidification extrusion molding in accordance with the following Steps I to III:

(I) Step I of feeding the PVDF resin powder to an extrusion molding machine linked to a mold device composed of a die nozzle and a forming die equipped with a cooling device on an external portion thereof and with a passage linked to a passage of the die nozzle in an internal portion thereof;

(II) Step II of melting the resin powder by the extrusion molding machine into a resin melt; and (III) Step III of extruding the resin melt from the die nozzle and injecting it into the forming die shaped in a desired form to cool and solidify the extrudate in the molten state in the interior of the forming die.

Examples of the molding include round bars, plates and pipes. Accordingly, in order to obtain these continuous moldings by the solidification extrusion molding, the above-described Steps I to III are continuously carried out. In Steps II and III in particular, while melting the resin powder by the extrusion molding machine into the resin melt, the resin melt is continuously extruded from the die nozzle and injected into the forming die. The main body of the extrusion molding machine is a cylinder with a built-in screw. In Step I, it is preferable to adopt a process comprising feeding the PVDF resin powder for melt molding in the state of the resin powder to the inlet of the cylinder from a feeder by starved feeding at such a feed rate that the cylinder can be seen at the inlet of the cylinder.

In the injection molding and solidification extrusion molding making use of the PVDF resin powder, it is desirable that the PVDF resin powder is fed by the starved feeding to prevent the resin powder from being fed in excess, whereby the intermesh of the resin powder with the screw is stabilized to prevent surging and stabilize an injection rate or extrusion rate.

As the screw, may be used a generally marketed screw for injection molding or extrusion molding. As an example of a screw design includes a design of L/D=20 to 24, a compression ratio=2 to 3, a feed zone=10 to 14D, a compression zone=3 to 4D and a metering zone=6 to 7D. However, the present invention is not limited to such a design.

The injection-molded product and extrusion-molded product obtained by the production process according to the present invention are preferably heated to a temperature from 100° C. to a temperature at which the solidified state can be retained, preferably a temperature close to the softening point of the PVDF resin to remove residual stress. The time required for this heat treatment is generally at least 30 minutes, preferably from 1 hour to 24 hours. The moldings are cooled after the heat treatment. This heat/cooling treatment is referred to as annealing. The heat treatment may be conducted by, for example, leaving the molding to stand in a heating oven.

According to the melt molding process using the PVDF resin powder according to the present invention, a molding improved in yellowness index (YI) and having a good color tone compared with the case where melt molding is conducted after pelletizing can be obtained. On the other hand, the molding obtained by conducting the melt molding using the PVDF resin powder has mechanical properties equivalent to those of a molding obtained by conducting the melt molding after pelletizing and is excellent in dimensional stability and free of voids.

EFFECTS OF THE INVENTION

The PVDF resin powder for melt molding according to the present invention can be stably fed to an injection molding machine or extrusion molding machine in the form of the resin powder and can provide moldings, which are excellent in various properties like a case where pellets are used, and inhibited from coloring compared with the case where pellets are used.

According to the production process of the present invention, the PVDF resin powder obtained by polymerization and having the specific powder characteristics is used, whereby injection molding or extrusion molding can be conducted in the form of the resin powder without pelletizing the powder. According to the production process of the present invention, moldings, which are excellent in various properties and inhibited from coloring, can be stably and inexpensively produced.

EXAMPLES

The present invention will hereinafter be described more specifically by the following Examples and Comparative Examples.

Measuring methods for characteristics or properties and physical properties in the present invention are as follow.

1. Characteristics of Resin Powder (a) Particle Size Distribution

The particle size distribution of PVDF resin powder was measured by a dry sieving method in accordance with JIS K 0069-3.1 by means of a Ro-Tap II type Sieve Shaker D Model manufactured by Heiko Seisakusho K.K. The average particle diameter was calculated and determined by a logarithmic normal distribution method based on the measured result of the particle size distribution. The average particle diameter was determined to be a particle diameter indicating a 50% cumulative value ($D_{50}$) in the particle size cumulative distribution. A value [$(D_{80}-D_{20})/D_{50}$] obtained by dividing a particle diameter breadth ($D_{80}-D_{20}$) represented by a difference between the 80% cumulative value ($D_{80}$) and the 20% cumulative value ($D_{20}$) by the 50% cumulative value ($D_{50}$) was used as an index to the spread of the particle size distribution.

(b) Bulk Density

The bulk density of PVDF resin powder was measured in accordance with a measuring method for "Bulk Specific Gravity" in JIS K 6721-3.3. More specifically, about 120 ml of a powder sample fully stirred and mixed was placed in a funnel, into which a damper of a bulk specific gravity measuring device had been inserted, and the damper was then quickly pulled up to drop the sample on a receiver. After a sample portion protuberant from the receiver was rubbed off by a glass rod, the mass of the receiver, on which the sample had placed, was precisely weighed to 0.1 g to determine a bulk density in accordance with the following equation.

$$S=(C-A)/B$$

wherein S: bulk density (g/cm$^3$)

A: mass of the receiver (g)

B: internal volume of the receiver (cm$^3$)

C: mass of the receiver, on which the sample had placed (g).

The measurement was conducted 3 times to calculate out an average value. The result of the test was indicated by rounding a value measured down to the third decimal place to three decimal places.

(c) Angle of Repose

The angle of repose of PVDF resin powder was determined by a method in which 100 ml of resin powder fully stirred and mixed is placed in a funnel, into which a damper of a bulk specific gravity measuring device prescribed in JIS K 6721 is inserted, and the damper is quickly pulled up to drop the sample on a sample plate having a diameter of 80 mm from a height of 100 mm, thereby measuring an angle of repose of the resin powder deposited on the sample plate. The measuring temperature was 22° C.

2. Mechanical Properties (1) Bending Test

A bending test was carried out at a measuring temperature of 23° C., a distance between the supports of 50 mm and a crosshead speed of 1.5 mm/min by means of a 2T Autograph AG2000 System manufactured by Shimadzu Corporation in accordance with ASTM D-790. By this bending test, a flexural modulus (deflection=1.2 mm) (unit=MPa) and flexural strength (maximum stress; unit=MPa) were measured. A specimen was annealed by a method that the specimen is heated and held for 5 hours at 150° C. and then gradually cooled to room temperature.

(2) Tensile Test

A tensile test was carried out at a measuring temperature of 23° C., a gauge length of 50 mm and a crosshead speed of 5 mm/min by means of a 2T Autograph AG2000 System manufactured by Shimadzu Corporation in accordance with ASTM D-638. By this tensile test, tensile strength (tensile yield strength; MPa) was measured. A specimen was annealed by a method that the specimen is heated and held for 5 hours at 150° C. and then gradually cooled to room temperature.

3. Measurement of Color Tone

The measurement of color tone was conducted by measuring an L value and a YI value by means of a color difference meter (ZE2000 manufactured by Nippon Denshoku Kogyo K.K.) in accordance with ASTM D-1925. A specimen was annealed by a method that the specimen is heated and held for 5 hours at 170° C. and then gradually cooled to room temperature. The measured values indicate that coloring is little as the YI value is small, and the L value is large. Upon the measurement, a white plate was arranged on the back of the specimen.

Example 1

1. Synthesis of Polyvinylidene Fluoride Resin Powder (A)

An autoclave having an internal volume of 20 liters was charged with 10,730 g of ion-exchanged water, 2.10 g of methyl cellulose, 92.2 g of ethyl acetate, 25.1 g of di-n-propyl peroxydicarbonate and 4,190 g of vinylidene fluoride to conduct a reaction for 5.5 hours at 26° C. The temperature was then raised to 40° C. to conduct a reaction for 7 hours. After the suspension polymerization reaction was completed, a slurry containing a polymer formed was dehydrated, washed with water, dehydrated and then dried for 20 hours at 80° C. to obtain polyvinylidene fluoride resin powder (A) at a yield of 90%.

The inherent viscosity of the thus-obtained polyvinylidene fluoride resin powder (A) was 1.01 dl/g, and its melting point was 175° C. The particle size distribution of this resin powder (A) was such that the average particle diameter was 172 μm, the proportion of powder having a particle diameter of at most 45 μm was 0.7% by weight, and the proportion of powder having a particle diameter of at most 355 μm was 1.0% by weight. The bulk density of the resin powder (A) was 0.45 g/cm$^3$, and the angle of repose was 32°.

In this polyvinylidene fluoride resin powder (A), a value $[(D_{80}-D_{20})/D_{50}]$ obtained by dividing a particle diameter breadth $(D_{80}-D_{20})$ represented by a difference between the 80% cumulative value $(D_{80})$ and the 20% cumulative value $(D_{20})$ by the 50% cumulative value $(D_{50})$ was 0.52.

2. Injection Molding

The polyvinylidene fluoride resin powder (A) synthesized above was fed through a constant volume feeder installed in an injection molding machine (IS25EP-1YV manufactured by Toshiba Machine Co., Ltd.) at such a feed rate (i.e., by starved feeding) that a screw can be slightly seen at the inlet of a heated cylinder.

The resin powder was melted under conditions that a revolution speed of an extruder screw within the heated cylinder was 96 revolutions/min, and the cylinder temperature was 200 to 230° C., and the resultant resin melt was injected into a mold through a nozzle controlled to a temperature of 230° C. under conditions of an injection pressure of 246 MPa, a mold temperature of about 100° C., a filling time of 6.4 seconds, an injection time of 20 seconds and a cooling time of 30 seconds, thereby producing specimens for bending test, tensile test and color tone. The injection mold is a mold capable of molding specimens suitable for ASTM D-790, D-638 and D-1925 at the same time. The measured results are shown in Table 1.

Comparative Example 1

1. Commercially Available Polyvinylidene Fluoride Resin Powder

The particle size distribution of commercially available polyvinylidene fluoride resin powder (product of ATOFINA CHEMICALS INC., trade name "Kynar 741") was measured. As a result, the average particle diameter was 167 μm, the proportion of powder having a particle diameter of at most 45 μm was 3.5% by weight, the proportion of powder having a particle diameter of at most 355 μm was 1.9% by weight, and the normalized value $[(D_{80}-D_{20})/D_{50}]$ of particle diameter was 1.08. The bulk density of this resin powder was 0.22 g/cm$^3$, and the angle of repose was 45°. In other words, this commercially available polyvinylidene fluoride resin powder was low in bulk density and high in angle of repose.

2. Injection Molding

The above-described polyvinylidene fluoride resin powder (Kynar 741) was used to try injection molding under the same conditions as in Example 1. As a result, the resin powder did not flow from the constant volume feeder into the heated cylinder even when the screw revolution speed of the constant volume feeder was variously changed. Further, the resin powder was fed directly into the heated cylinder from a hopper without passing through the constant volume feeder. However, the intermesh of the resin powder with an extruder screw was poor, so that the resin powder could not be smoothly fed. The revolution speed of the extruder screw was variously changed from 96 revolutions/min. however, the resin powder could still not smoothly fed, so that the injection molding could not be normally conducted. The measured results are shown in Table 1.

Comparative Example 2

1. Pelletizing

The polyvinylidene fluoride resin powder (A) synthesized in Example 1 was melt-extruded at 230° C. by means of LS-20 manufactured by Toyo Seiki Co., Ltd., and the resultant extrudate was cut into a size of about 3 mm in diameter and 3 mm in length to produce pellets.

2. Injection Molding

Injection molding was conducted under the same conditions as in Example 1 except that the above-described pellets were used, thereby producing the respective specimens. The measured results are shown in Table 1.

Example 2

1. Synthesis of Polyvinylidene Fluoride Resin Powder (B)

An autoclave having an internal volume of 20 liters was charged with 10,730 g of ion-exchanged water, 1.26 g of methyl cellulose, 28.1 g of ethyl acetate, 25.1 g of di-n-propyl peroxydicarbonate, 4,085 g of vinylidene fluoride and 105 g of hexafluoropropylene to conduct a reaction for 17.5 hours at 26° C. The temperature was then raised to 40° C. to conduct a reaction for 4 hours. In the course of the suspension polymerization reaction, 132 g of ethyl acetate was additionally charged at the time 5 hours had elapsed from the beginning of the polymerization.

After the suspension polymerization reaction was completed, a slurry containing a polymer formed was dehydrated, washed with water, dehydrated and then dried for 20 hours at 80° C. to obtain polyvinylidene fluoride resin powder (B) at a yield of 88%. The inherent viscosity of the polyvinylidene fluoride resin powder (B) was 1.05 dl/g, and its melting point was 172° C. The particle size distribution of the resin powder (B) was such that the average particle diameter was 195 μm, the proportion of powder having a particle diameter of at most 45 μm was 0.3% by weight, the proportion of powder having a particle diameter of at most 355 μm was 3.0% by weight, and the normalized value $[(D_{80}-D_{20})/D_{50}]$ of particle diameter was 0.52. The bulk density of the resin powder (B) was 0.42 g/cm$^3$, and the angle of repose was 28°.

2. Solidification Extrusion Molding

The polyvinylidene fluoride resin powder (B) synthesized above was fed to a heated cylinder of a single-screw extruder (30 mm in diameter, L/D=10) through a constant volume at such a feed rate (i.e., by starved feeding) that a screw can be slightly seen at the inlet of the heated cylinder. The resin powder was melted under conditions that a revolution speed of a screw was 47 revolutions/min, and the cylinder temperature was 50 to 220° C., and the resultant resin melt was extruded into a forming die controlled to a temperature of 210° C. and a die external pressure of 360 MPa to mold a round bar having a diameter of 150 mm at a molding speed of 100 mm/hr.

The resultant round bar had good color tone. This round bar was cut at intervals of 50 cm in its longitudinal direction to investigate its section. As a result, it was confirmed that neither pores (shrink voids) nor microvoids were observed at all the sections, and so the round bar was homogeneous.

3. Color Tone and Mechanical Properties

Polyvinylidene fluoride resin powder (B) synthesized by the same process as described above was used to produce specimens for bending test, tensile test and color tone by injection molding under the same conditions as in Example 1. The results are shown in Table 1.

TABLE 1

|  | Example | | Comparative Example | |
| --- | --- | --- | --- | --- |
|  | 1 | 2 | 1 | 2 |
| Kind of PVDF | PVDF(A) | PVDF(B) | Marketed product | PVDF(A) |
| Powder characteristics of PVDF | Powder | Powder | Powder | Pellets |
| Average particle diameter (μm) | 172 | 195 | 167 | — |
| At most 45 μm (wt. %) | 0.7 | 0.3 | 3.5 | — |
| At least 355 μm (wt. %) | 1.0 | 3.0 | 1.9 | — |
| Bulk density (g/cm$^3$) | 0.45 | 0.42 | 0.22 | — |
| Angle or repose (°) | 32 | 28 | 45 | — |
| $(D_{80} - D_{20})/D_{50}$ | 0.52 | 0.52 | 1.08 | — |
| Injection molding | Possible | Possible | Impossible | Possible |
| Properties before annealing | | | | |
| L value | 52.74 | 54.55 | — | 52.99 |
| YI | 0.31 | 0.25 | — | 1.58 |
| Flexural modulus (MPa) | 1804 | 1700 | — | 1809 |
| Flexural strength (MPa) | 60 | 57 | — | 60 |
| Tensile strength (MPa) | 55 | 52 | — | 55 |
| Properties after annealing | | | | |
| L value | 52.02 | 54.01 | — | 52.22 |
| YI | 5.85 | 5.65 | — | 8.22 |
| Flexural modulus (MPa) | 1900 | 1750 | — | 1890 |
| Flexural strength (MPa) | 61 | 58 | — | 61 |
| Tensile strength (MPa) | 55 | 52 | — | 55 |

When the results of Example 1 and Comparative Example 1 (marketed product) are compared with each other, it is understood that the polyvinylidene fluoride resin powder (Example 1), which has the specific particle size distribution and is sharp in particle size distribution, high in bulk density and low in angle of repose, is excellent in injection moldability compared with the polyvinylidene fluoride resin powder (Comparative Example 1), which is broad in particle size distribution, low in bulk density and high in angle of repose.

When the results of Example 1 and Comparative Example 2 (pellets) are compared with each other, it is understood that when the polyvinylidene fluoride resin powder (Example 1), which has the specific particle size distribution and is sharp in particle size distribution, high in bulk density and low in angle of repose, is fed to an injection molding machine in the form of the resin powder as it is, thereby conducting injection molding, the resultant molding does substantially not have a difference in mechanical properties and moreover is small in both L value and YI value compared with the case where the same resin powder is pelletized and then fed to the injection molding machine (Comparative Example 2), so that a molded product good in color tone is provided.

Even when the polyvinylidene fluoride resin powder obtained in Example 2 is used, such resin powder exhibits excellent melt processing ability, so that an injection-molded product good in color tone and excellent in mechanical properties can be provided (the specimens are produced by injection molding).

In addition, the polyvinylidene fluoride resin powder obtained in Example 2 is used to conduct solidification extrusion molding, whereby an extruded product good in color tone and free of voids can be provided.

INDUSTRIAL APPLICABILITY

The PVDF resin powder according to the present invention can be molded into various kinds of moldings by melt molding such as injection molding or extrusion molding. The moldings obtained by the production process according to the present invention are good in color tone and excellent in mechanical properties, so that they can be utilized in a wide variety of application fields such as electric and electronic materials, machining stocks and others.

The invention claimed is:

1. Polyvinylidene fluoride resin powder for melt molding by injection molding or extrusion molding in a state of the resin powder, which has such powder characteristics (a) to (c) that
    (a) the resin powder exhibits, as determined by a dry sieving method in accordance with JIS K 0069, such particle size distribution characteristics that
        i) an average particle diameter indicated by a 50% cumulative value ($D_{50}$) in a particle size cumulative distribution is 80 to 250 μm,
        ii) a proportion of resin powder having a particle diameter of at most 45 μm is at most 3.0% by weight,
        iii) a proportion of resin powder having a particle diameter of at least 355 μm is at most 5.0% by weight, and
        iv) a value [($D_{80}$-$D_{20}$)/$D_{50}$] obtained by dividing a particle diameter breadth ($D_{80}$-$D_{20}$) represented by a difference between a 80% cumulative value ($D_{80}$) and a 20% cumulative value ($D_{20}$) in the particle size cumulative distribution by the 50% cumulative value ($D_{50}$) is at most 0.8,
    (b) a bulk density is 0.40 to 0.70 g/cm$^3$, and
    (c) an angle of repose is at most 35°.

2. The polyvinylidene fluoride resin powder for melt molding according to claim 1, wherein the average particle diameter indicated by the 50% cumulative value ($D_{50}$) is 130 to 210 μm.

3. The polyvinylidene fluoride resin powder for melt molding according to claim 1, wherein the angle of repose is 23 to 35°.

4. A process for producing a polyvinylidene fluoride resin molding, which comprises the following Steps 1 to 3:
    1) Step 1 of feeding polyvinylidene fluoride resin powder for melt molding to a melt molding machine in a state of the resin powder through an inlet of a cylinder equipped with a screw in the melt molding machine by starved feeding at a feed rate that the screw can be seen at the inlet of the cylinder through a feeder, wherein the melt molding machine is an injection molding machine or an extrusion molding machine, and said polyvinylidene fluoride resin powder has such powder characteristics (a) to (c) that
        (a) the resin powder exhibits, as determined by a dry sieving method in accordance with JIS K 0069, such particle size distribution characteristics that
            i) an average particle diameter indicated by a 50% cumulative value ($D_{50}$) in a particle size cumulative distribution is 80 to 250 μm,
            ii) a proportion of resin powder having a particle diameter of at most 45 μm is at most 3.0% by weight,
            iii) a proportion of resin powder having a particle diameter of at least 355 μm is at most 5.0% by weight, and
            iv) a value [($D_{80}$-$D_{20}$)/$D_{50}$] obtained by dividing a particle diameter breadth ($D_{80}$-$D_{20}$) represented by a difference between a 80% cumulative value ($D_{80}$) and a 20% cumulative value ($D_{20}$) in the particle size cumulative distribution by the 50% cumulative value ($D_{50}$) is at most 0.8,
        (b) a bulk density is 0.40 to 0.70 g/cm$^3$, and
        (c) an angle of repose is at most 35°, in a state of the resin powder;
    2) Step 2 of heating and melting the resin powder in the melt molding machine into a resin melt; and
    3) Step 3 of injecting the resin melt into a mold to mold the resin melt.

5. The production process according to claim 4, wherein the average particle diameter indicated by the 50% cumulative value ($D_{50}$) is 130 to 210 μm.

6. The production process according to claim 4, wherein the angle of repose is 23 to 35°.

7. The production process according to claim 4, wherein in Step 3, the resin melt is injected into the mold under a pressure of 50 to 500 MPa.

8. The production process according to claim 4, wherein the melt molding machine is the injection molding machine, and the mold is an injection mold.

9. The production process according to claim 8, wherein
    in Step 1, the polyvinylidene fluoride resin powder for melt molding is fed in a state of the resin powder to an inlet of a cylinder equipped with a screw in the injection molding machine by starved feeding at a feed rate that the screw can be seen at the inlet of the cylinder through a feeder,
    in Step 2, the resin powder is heated and melted in the cylinder controlled to a temperature of 190 to 280° C. into a resin melt, and
    in Step 3, the resin melt is injected into the mold controlled to a temperature of 80 to 150° C. from a nozzle on the tip of the cylinder under an injection pressure within the cylinder of 50 to 500 MPa to mold the resin melt.

10. The production process according to claim 4, wherein the melt molding machine is the extrusion molding machine, and the mold is a forming die into which the resin melt ejected from a die nozzle on the tip of the extrusion molding machine is filled.

11. The production process according to claim 10, wherein the Steps 1 to 3 comprise the following Steps I to III:
    (I) Step I of feeding the polyvinylidene fluoride resin powder for melt molding to an inlet of a cylinder equipped with a screw in the extrusion molding machine by starved feeding at a feed rate that the screw can be seen at the inlet of the cylinder through a feeder, and said extrusion molding machine is linked to a mold device composed of the die nozzle and the forming die equipped with a cooling device on an external portion thereof and with a passage linked to a passage of the die nozzle in an internal portion thereof;

(II) Step II of melting the resin powder by the extrusion molding machine into a resin melt; and (III) Step III of extruding the resin melt from the die nozzle and injecting it into the forming die shaped in a desired form to cool and solidify the extrudate in the molten state in the interior of the forming die.

12. The production process according to claim 11, wherein in Step II, the resin powder is heated and melted in the cylinder controlled to a temperature of 50 to 280° C. into a resin melt, and in Step III, the resin melt is extruded from the die nozzle controlled to a temperature of 190 to 280° C. and injected into the forming die under a pressure of 50 to 500 MPa to conduct solidification extrusion molding.

* * * * *